United States Patent [19]
Keith

[11] 3,893,058
[45] July 1, 1975

[54] ELECTRONIC THERMOMETER PROBE
[75] Inventor: Arlie L. Keith, Orlando, Fla.
[73] Assignee: J & J Manufacturing Corporation, West Palm Beach, Fla.
[22] Filed: Mar. 6, 1973
[21] Appl. No.: 338,501

[52] U.S. Cl. ............... 338/28; 73/362 AR; 338/23
[51] Int. Cl. .................................... G01k 7/22
[58] Field of Search .................... 338/28, 22 S, 23; 73/362 AR, 362 R

[56] References Cited
UNITED STATES PATENTS
| | | | |
|---|---|---|---|
| 1,190,978 | 7/1916 | Bliss | 73/362 AR |
| 1,902,427 | 3/1933 | Sawyer | 73/362 AR |
| 3,025,706 | 3/1962 | Oppenheim | 73/362 AR |
| 3,540,283 | 11/1970 | Dean | 73/362 AR |

Primary Examiner—Donald D. Woodiel
Attorney, Agent, or Firm—Jack N. McCarthy

[57] ABSTRACT

A thermistor-type clinical probe for an electronic thermometer for use in oral or rectal applications to obtain body temperature measurements wherein the probe stem or foundation member has an electrically isolated resistor and thermistor thereon. A resistor is placed on the foundation member in a spiral manner for a given length and is insulated from a ground member. A thermistor is placed over said resistor in a spiral manner and insulated therefrom, said thermistor being wound in a spiral manner in the opposite direction from said resistor. The end of the probe containing the resistor and thermistor is coated for protection and lead wires can be connected to the other ends of the resistor, thermistor and ground member.

5 Claims, 5 Drawing Figures

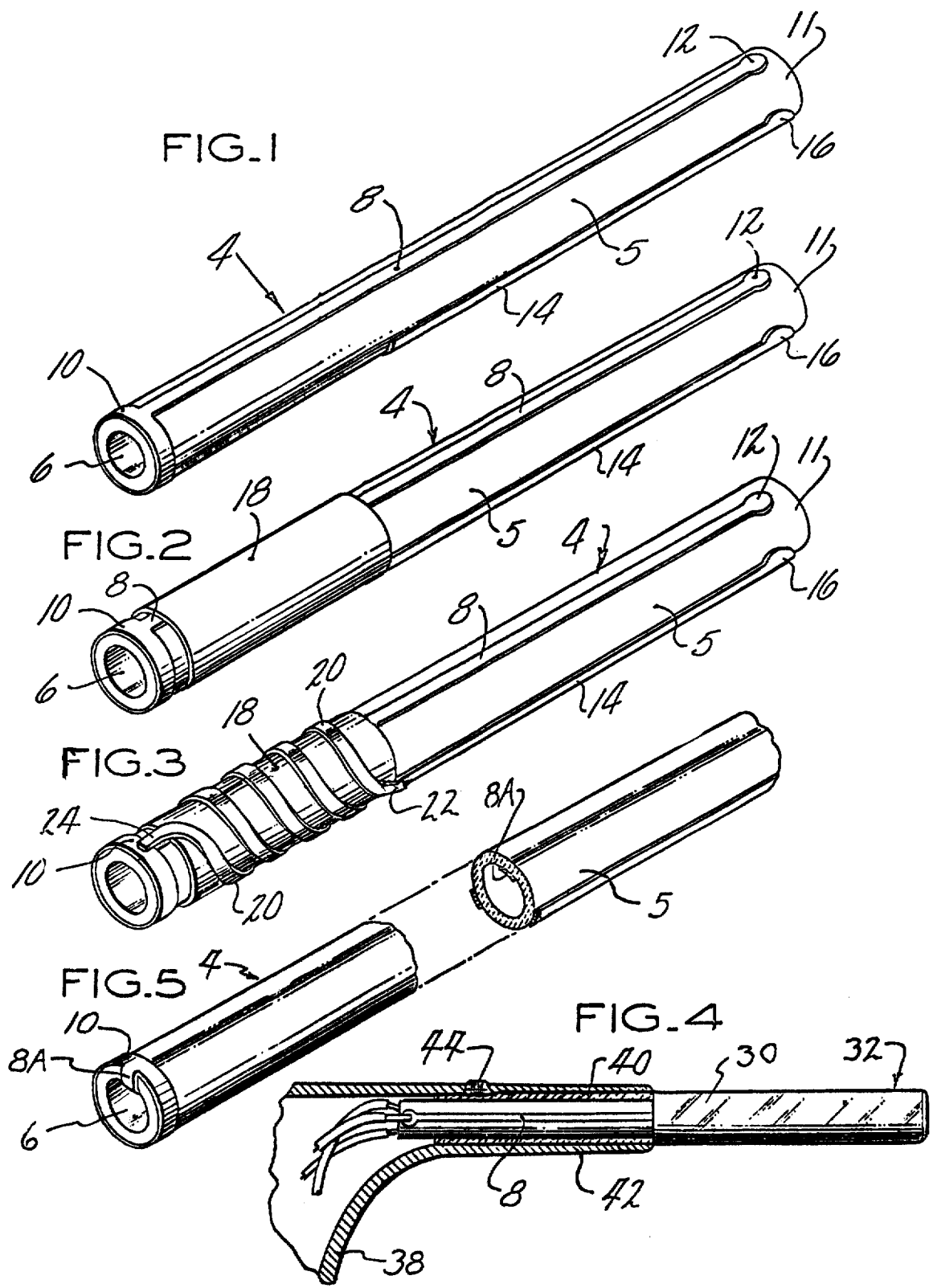

ELECTRONIC THERMOMETER PROBE

CROSS-REFERENCES TO RELATED APPLICATION

This application describes a probe which, while it is useful on many electronic thermometers, was designed for operation with the Digital Clinical Thermometer shown in my co-pending application Ser. No. 170,468 filed Aug. 10, 1971.

BACKGROUND OF THE INVENTION

This invention generally relates to improvements in electronic clinical thermometer probes and more particularly, to improvements in accuracy and speed of response in sensing temperatures.

The prior art utilizes thermistor probes most generally constructed of stainless steel or other tubing with a small thermistor bead mounted on the end. This construction forms a probe which has a long time constant. A further disadvantage of small bead thermistors is that they only effectively measure the temperature of a single small point. While there is some averaging effect due to the fact that the metal or other tube parts are spread over a larger area and tend to carry the heat to the bead thermistor, this arrangement tends to increase the time in which an accurate reading can take place. A sampling of the prior art is shown in U.S. Pat. No. 3,025,706, U.S. Pat. No. 3,469,449, U.S. Pat. No. 3,540,283, U.S. Pat. No. 3,402,378 and U.S. Pat. No. 3,477,292.

SUMMARY OF THE INVENTION

The primary object of the present invention is to provide an improved electronic clinical thermometer probe having a thermistor with heating means for preheating the probe.

In accordance with the present invention, a probe is provided having a foundation member with low heat capacity and low thermal conductivity, but mechanically strong enough to withstand shock and vibration which might be found in a hospital or a clinic.

In accordance with a further object of the present invention, a probe is provided which averages the temperature field to which it is exposed and senses said average temperature accurately and speedily.

In accordance with the present invention, a probe is provided having a thermistor material for sensing temperature wound therearound in one direction. A resistor material for heating said thermistor material is wound around the probe in the opposite direction when heating is desired.

This invention provides a thermistor probe which is chemically impervious to all liquids and gasses to which the unit might be normally exposed in a hospital or a clinic. This includes high-temperature sterilization in an autoclave.

This invention provides a method for making a thermistor probe as summarized.

BRIEF DESCRIPTION OF THE DRAWINGS

FIG. 1 is a view of the foundation member of substrate with three conductors attached.

FIG. 2 is a view showing the device of FIG. 1 with a first insulating layer applied.

FIG. 3 is a view showing the device of FIG. 2 wherein a resistor material is located over the first insulating layer.

FIG. 4 is a view showing the completed probe mounted in a gun-type adapter.

FIG. 5 is a fragmentary view similar to FIG. 1 showing a modification where the long conductor extends through a longitudinal opening in the foundation member or substrate.

DESCRIPTION OF THE PREFERRED EMBODIMENT

Referring to FIG. 1, a foundation or substrate member 4 is shown formed as a tube 5 with an opening 6 extending axially therethrough. Three conductors are located thereon. The one conductor 8 is a long conductor and has a ring 10 around one end of the foundation member 4, which will be the finished tip of the probe, and an enlarged portion 12 at the other end 11 of the foundation member for soldering purposes. One of two short conductors is shown at 14 and it extends from the end 11 to a point spaced from the ring 10. This space determines the approximate length of the sensing portion of the probe. Its other end at the end 11 of the foundation member is also formed as an enlarged portion 16 for soldering purposes. The other short conductor is formed in a like manner. The three conductors are spaced approximately 120° apart around the foundation or substrate member.

An insulating material is placed around the end of the foundation or substrate member which will be the finished tip of the probe, forming a sleeve 18, leaving the ring 10 so that it is exposed and just covering the adjacent ends of the short conductors. (Only the one conductor 14 is shown — see FIG. 2.)

A resistor material 20 is placed around the sleeve 18 of insulating material connecting the conductor 14 at 22 where it engages the insulating material to the long conductor 8 at 24 adjacent the ring 10. This material 20 winds around the sleeve 18 of insulating material in a spiral manner.

An insulating material, similar to the insulating material referred to above, is placed over the resistor material 20, forming a sleeve extending for approximately the same length as the first insulating sleeve 18. The covering should be such that the resistor material will not be exposed to accidental shorting. A thermistor material is placed around the second sleeve of insulating material connecting the other short conductor where it engages the insulating material to the ring 10 and long conductor 8. This thermistor material winds around the insulating material in a spiral manner; however, the winding is opposite in direction to that of the resistor material 20 so that the thermistor material crosses the resistor material 20 as it winds over the second insulating sleeve. A protective coating 30 is placed over the entire end of said foundation or substrate covering the thermistor material and exposed end and ring 10 of the long conductor 8. It is noted that the thickness of the elements on the foundation or substrate member in the figures has been exaggerated for clarity of construction.

While many methods and materials can be used to construct a probe as set forth above, it is noted that "thick film" and "thin film" techniques are means of accomplishing the construction of the probe. In the "thick film" technique, inks or pastes are printed or smeared onto a ceramic and subsequently fired and baked onto the ceramic. In a "thin film" technique, materials for printing a circuit are placed into a vacuum chamber and the materials heated, which deposits it onto a ceramic.

A specific fabrication specification prepared to make a probe set forth in this disclosure is outlined below:

1. A substrate is formed of a material which is approximately 96% alumina;
2. The long conductor and two short conductors are printed on the substrate;
3. A dielectric material is coated over the conductors covering the appropriate area. This step is repeated to insure a proper insulation;
4. A resistor material is printed on the dielectric material and connected to the appropriate conductors;
5. This step is similar to Step 3 which is the application of the dielectric material covering the appropriate area;
6. A thermistor material is printed on the dielectric material and connected to the appropriate conductors;
7. A final layer is applied which is a protective ceramic layer.

In the above specified method, the following materials were used:

a. A conductor material of ESL 6800 B (palladium-gold paste);
b. A dielectric material of ESL 4608 (ceramic coating-glaze);
c. A resistor material of ESL 3800 Series (noble metal resistive paste);
d. A thermistor material of NTC 2413 (thermistor paste);
e. A protective material of ESL 4771 (ceramic coating-resistor overglaze).

(ESL and NTC are letters representing products of Electro-Science Laboratories, Inc.)

The finished probe has its sensing end 32 formed of a larger diameter than the rest of the probe. While the probe may be mounted in many ways, it is shown in a gun-type adapter 38 in FIG. 4 with the sensing end 32 abutting a plastic sleeve 40 within a tubular projection 42. A set screw 44 in the tubular member 42 squeezes the plastic sleeve 40 against the probe and holds it in place.

FIG. 5 is a modification where the long conductor 8A extends through the opening 6 of the foundation or substrate member 4. It is the ring 10 around the one end of the tube 5 and to the enlarged portion 12 around the other end of the tube 5. The remainder of the probe construction is the same as set forth before, It can be seen that the first insulating sleeve can be omitted in this method of making the probe.

I claim:

1. A probe for an electronic thermometer having an elongated foundation member, a long conductor member extending axially along said foundation member to one end, a first shorter conductor member extending axially to a first location spaced from the end, a second shorter conductor member extending axially to a second location spaced from the end, a resistor material connecting said first shorter conductor at said first location to said long conductor at the end of said foundation member, a first insulating material insulating said resistor material from said long conductor except at the end where they are connected, a thermistor material connecting said second shorter conductor at said second location to said long conductor at the end of said foundation member, a second insulating material insulating said thermistor material from said resistor material and said long conductor except at the end where they are connected, said resistor material and said thermistor material being positioned relative to each other so that heat from said resistor material will heat said thermistor material, a protective covering being located over and fixed to the end of said foundation member containing the resistor material and thermistor material.

2. A probe as set forth in claim 1 wherein said resistor material is wound around the foundation member in one direction, and the thermistor material is wound around the foundation member in the opposite direction.

3. A probe as set forth in claim 1 wherein said elongated foundation member is a tubular member.

4. A probe as set forth in claim 3 wherein the long conductor member extends along the inside of said tube.

5. A probe as set forth in claim 3 wherein a conductor ring member is located around the one end of the tubular member, said long conductor being connected to said conductor ring member, said resistor material being connected to said conductor ring member at the one end, and said thermistor material being connected to said conductor ring member at said one end.

* * * * *